(No Model.)
C. DORN.
OIL FILTER.
No. 603,587. Patented May 3, 1898.
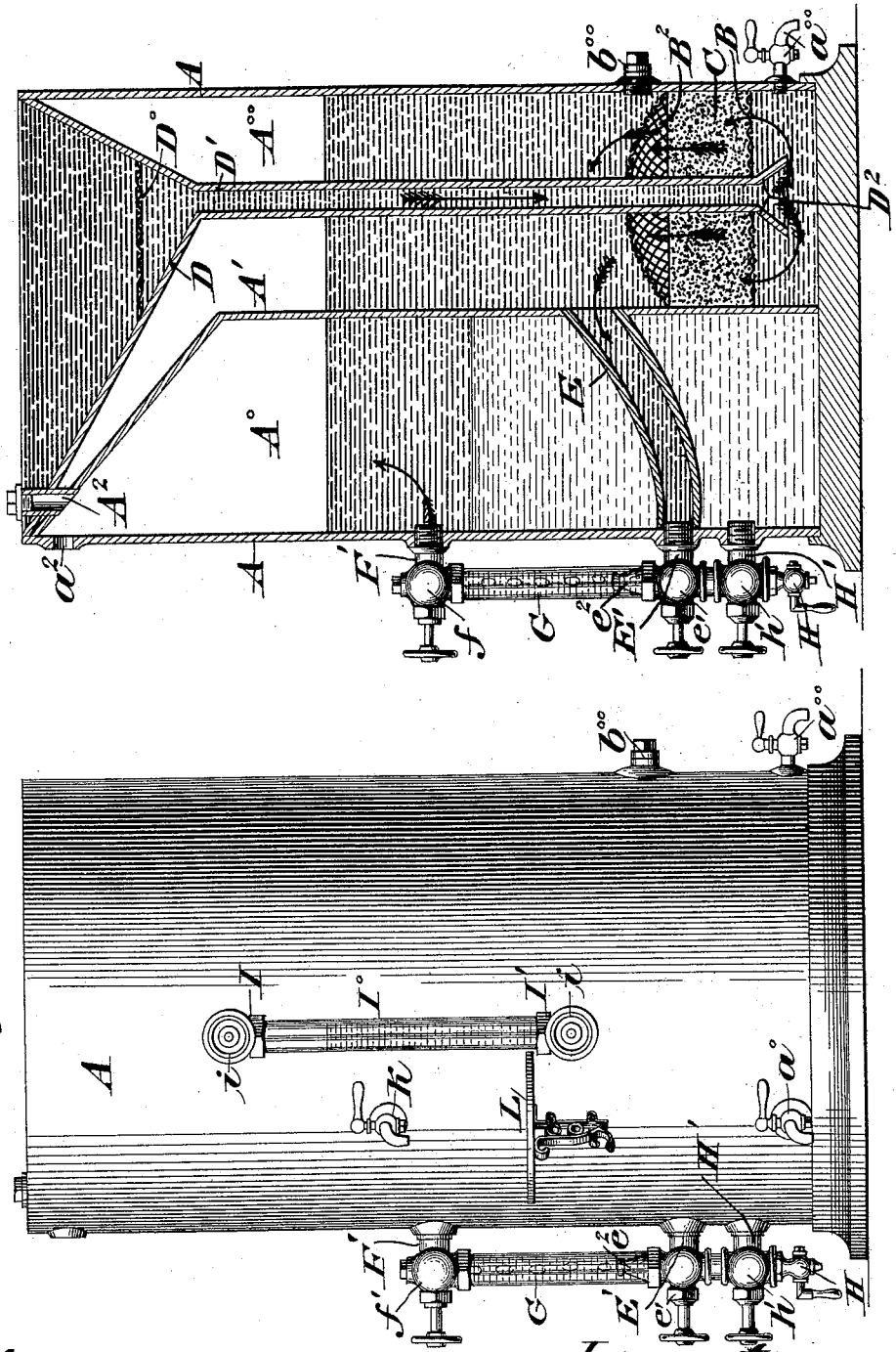
Witnesses.
Inventor.

UNITED STATES PATENT OFFICE.

CHRISTIAN DORN, OF PHILADELPHIA, PENNSYLVANIA, ASSIGNOR TO HARLEM P. HESS, OF EASTON, PENNSYLVANIA.

OIL-FILTER.

SPECIFICATION forming part of Letters Patent No. 603,587, dated May 3, 1898.

Application filed July 28, 1897. Serial No. 646,244. (No model.)

*To all whom it may concern:*

Be it known that I, CHRISTIAN DORN, a citizen of the United States, residing at Philadelphia, in the county of Philadelphia and State of Pennsylvania, have invented certain new and useful Improvements in Oil-Filters; and I do hereby declare the following to be a full, clear, and exact description of the invention, such as will enable others skilled in the art to which it appertains to make and use the same.

My invention relates to improvements in oil-filters; and it consists in the novel construction and arrangement hereinafter described and claimed.

My invention will be understood by reference to the accompanying drawings, wherein the same parts are indicated by the same letters throughout both views.

Figure 1 represents a side elevation of an oil-filter constructed according to my invention, and Fig. 2 represents a central vertical section through the same.

The body of the filter comprises an outer shell or casing A, having a partition A' therein which closes one portion of the inside of the shell A completely, forming a chamber $A^0$ and leaving another chamber $A^{00}$ with an enlarged upper end, as shown in Fig. 2. In the lower portion of the chamber $A^{00}$ are mounted two wire sieves B and $B^2$, the lower sieve B being preferably flat, while the upper sieve $B^2$ is in the form of an inverted basin. These two sieves are arranged a short distance from each other, and the space between the two is filled with small particles of cork or other suitable filtering material C, as seen in Fig. 2. Within the upper part of the chamber $A^{00}$ is fitted a funnel D, having a tube or pipe D' leading from its bottom downward through the sieves B and $B^2$ and through the filter material and terminating immediately beneath the lower sieve B in a flaring mouth $D^2$. Another wire sieve $D^0$ is provided in the funnel D to catch particles of foreign matter that may fall therein and would be liable to choke the tube or pipe D'.

A drain-cock $a^{00}$ is fitted into the shell A at the bottom of said chamber $A^{00}$, below the sieve B, to drain the oil from said chamber when desired, and a plug $b^{00}$ is fitted into the shell A, just above the upper sieve $B^2$, to allow access to the said upper sieve for cleaning or other purposes.

A pipe or tube E leads from the chamber $A^{00}$ by an opening in the partition A' through the chamber $A^0$ slightly downward to the outer shell A, as seen in Fig. 2. Into the outer end of this pipe or tube E is fitted a plug E', provided with a screw-valve $e'$ therein for opening and closing said plug. A second plug F' is fitted into an opening in the shell A a short distance above the plug E', and this second plug is also provided with a screw-valve $f'$ and is connected to the plug E' by means of a glass tube G, into the lower end of which glass tube projects a nozzle $e^2$ on the plug E', as seen in both the figures of the drawings.

A third plug H' is fitted into an opening in the shell A, just below the plug E', and also communicates with the said plug E' and is provided with a screw-valve $h'$. A drain-cock H is fitted into the lower side of the plug H', as shown. A drain-cock $a^0$ is fitted into the shell A at the lower portion of the chamber $A^0$ for emptying said chamber when desired.

A short tube $A^2$ is fitted in openings through the upper portions of the funnel D and the partition A', through which water may be poured into the chamber $A^0$, and an air-vent $a^2$ is provided through the shell A at the upper portion of the said chamber, as seen in Fig. 2.

A pair of plugs I and I', provided with screw-valves $i$ and $i'$ and connected by a sight-glass $I^0$, are fitted into the outer shell A outside of the chamber $A^0$, so that the amount of oil in the chamber $A^0$ may be readily seen from the outside when the valves in said plugs are open.

K represents a cock for drawing off the filtered oil from above the water in the chamber $A^0$, and L represents a shelf or bracket which may be mounted upon the outer shell A, beneath the cock K, for resting a vessel upon while filling from the cock K.

The operation of the filter is as follows: The plugs H' and F' being open and the plug E' closed water is poured into the chamber $A^0$ through the tube $A^2$ until it rises almost to the top of the sight-glass G. The crude oil is poured into the funnel D and passes downward through the tube D' and filters upward through the strainers B and B² and the filtering material C between them, rising in the chamber $A^{00}$. When the filtered oil has risen in the chamber $A^{00}$ above the outlet-pipe E, the plug E' in the outer end of said pipe may be opened, when the filtered oil will pass through said plug E', and escaping through the nozzle $e^2$ will rise in drops through the water in the sight-glass G, and if the filtered oil in the chamber $A^{00}$ be high enough will pass by way of the plug F' into the chamber $A^0$, where it will float upon the water in said latter chamber, as will be seen from an inspection of Fig. 2 of the drawings.

The amount of oil in the chamber $A^0$ will be indicated in the sight-glass $I^0$, and the oil may be drawn off by the cock K into any suitable receptacle therefor as needed for use.

It will be seen that the operation of the filter after once being started may be continuous by keeping the funnel D well filled with the unfiltered oil, which will gradually work its way downward through the pipe D' and will filter upward through the strainers and filter-bed hereinbefore referred to.

The pressure of the oil through the downwardly-curved pipe E will prevent any water entering the chamber $A^{00}$; but should any water enter such chamber it will settle in the bottom thereof and will not retard the action of the filter.

Having thus described my invention, what I claim, and desire to secure by Letters Patent of the United States, is—

1. In an oil-filter, the combination with a chamber $A^{00}$, a filter in the lower part of the said chamber, and means for introducing the oil beneath the said filter; of a second chamber $A^0$, means for introducing water in the said second chamber $A^0$, a sight-glass opening into the said chamber $A^0$ at two points, a pipe extending from the chamber $A^{00}$ through the said chamber $A^0$, a valve adapted to open the said pipe into the said sight-glass, and means for drawing the oil off from the water, substantially as described.

2. In an oil-filter, the combination with a chamber, a filter in the lower part of the said chamber, a funnel in the upper part of the said chamber, and a pipe from the said funnel extending through the said filter; of a second chamber $A^0$, means for introducing water in the said second chamber $A^0$, a sight-glass opening into the said chamber $A^0$ at two points, a pipe extending from the chamber $A^{00}$ through the said chamber $A^0$, a valve adapted to open the said pipe into the said sight-glass, and means for drawing the oil off from the water, substantially as described.

3. An oil-filter comprising two chambers; a filter in the lower portion of one of said chambers; an inlet-pipe entering said chamber and discharging beneath said filter; a drain-cock to said chamber; a downwardly-inclined pipe leading through the second chamber from said first chamber, and opening outside of said second chamber; a plug in the outer end of said pipe; a second plug communicating with said second chamber above said first plug; a glass tube connecting said plugs; a third plug communicating with said second chamber below said first plug and also with said plug; an inlet-pipe to said second chamber; a cock for drawing off the oil from said second chamber; and a sight-glass for showing the amount of oil in said chamber, substantially as described.

In testimony whereof I affix my signature in presence of two witnesses.

CHRISTIAN DORN.

Witnesses:
  JOS. H. BLACKWOOD,
  JOHN C. WILSON.